United States Patent [19]
Hara

[11] Patent Number: 5,251,089
[45] Date of Patent: Oct. 5, 1993

[54] MAGNETIC HEAD

[75] Inventor: Koichi Hara, Chichibu, Japan

[73] Assignee: Canon Denshi Kabushiki Kaisha, Chichibu, Japan

[21] Appl. No.: 725,324

[22] Filed: Jul. 8, 1991

[30] Foreign Application Priority Data

Jul. 9, 1990 [JP] Japan ................. 2-179549

[51] Int. Cl.$^5$ .................. G11B 5/29; G11B 5/115
[52] U.S. Cl. ...................... 360/121; 360/122
[58] Field of Search ................. 360/122, 121

[56] References Cited

U.S. PATENT DOCUMENTS 5,148,342 9/1992 Kato ........................... 360/121

FOREIGN PATENT DOCUMENTS 196605 10/1986 European Pat. Off. .
52-28308 3/1977 Japan ........................ 360/121

OTHER PUBLICATIONS

Patent Abstracts of Japan, P-1103, Sep. 10, 1990, vol. 14, No. 419, JP 2-161604.
Patent Abstracts of Japan, P-598, Jul. 23, 1987, vol. 11, No. 226, JP 62-42307.

Primary Examiner—Constantine Hannaher
Attorney, Agent, or Firm—Spencer, Frank & Schneider

[57] ABSTRACT

A magnetic head has a first magnetic core and a second magnetic core, a partition wall plate and sliders. The first and second magnetic cores are securely joined together through the partition wall plate in the widthwise direction of tracks of a recording medium. The sliders are disposed on the outer surfaces of the cores in the widthwise direction of the tracks. A surface of the partition wall that is opposite the recording medium is recessed from the sliding contact surfaces of the first and second magnetic cores and the sliders against the recording medium. This provides a concave groove which reduces the area of the sliding contact surface. Spacing loss by the magnetic head can be substantially extinguished and the wearing away of the recording medium can be avoided by air pressure produced in the concave groove.

13 Claims, 9 Drawing Sheets

(DIRECTION OF SLIDING OF MEDIUM)

FIG. 9 (PRIOR ART)

(DIRECTION OF SLIDING OF MEDIUM)

MAGNETIC HEAD

BACKGROUND OF THE INVENTION

1. Field of the Invention

The present invention relates to a magnetic head for reading data from and/or writing data on a magnetic disk as a magnetic recording medium.

2. Description of the Prior Art

There are various types of conventional magnetic heads, for reading data from and/or writing data on a floppy disk (a flexible magnetic disk) by so-called tunnel erasing technique. One of them is illustrated in FIGS. 7 through 9 as an example.

Figure 7:
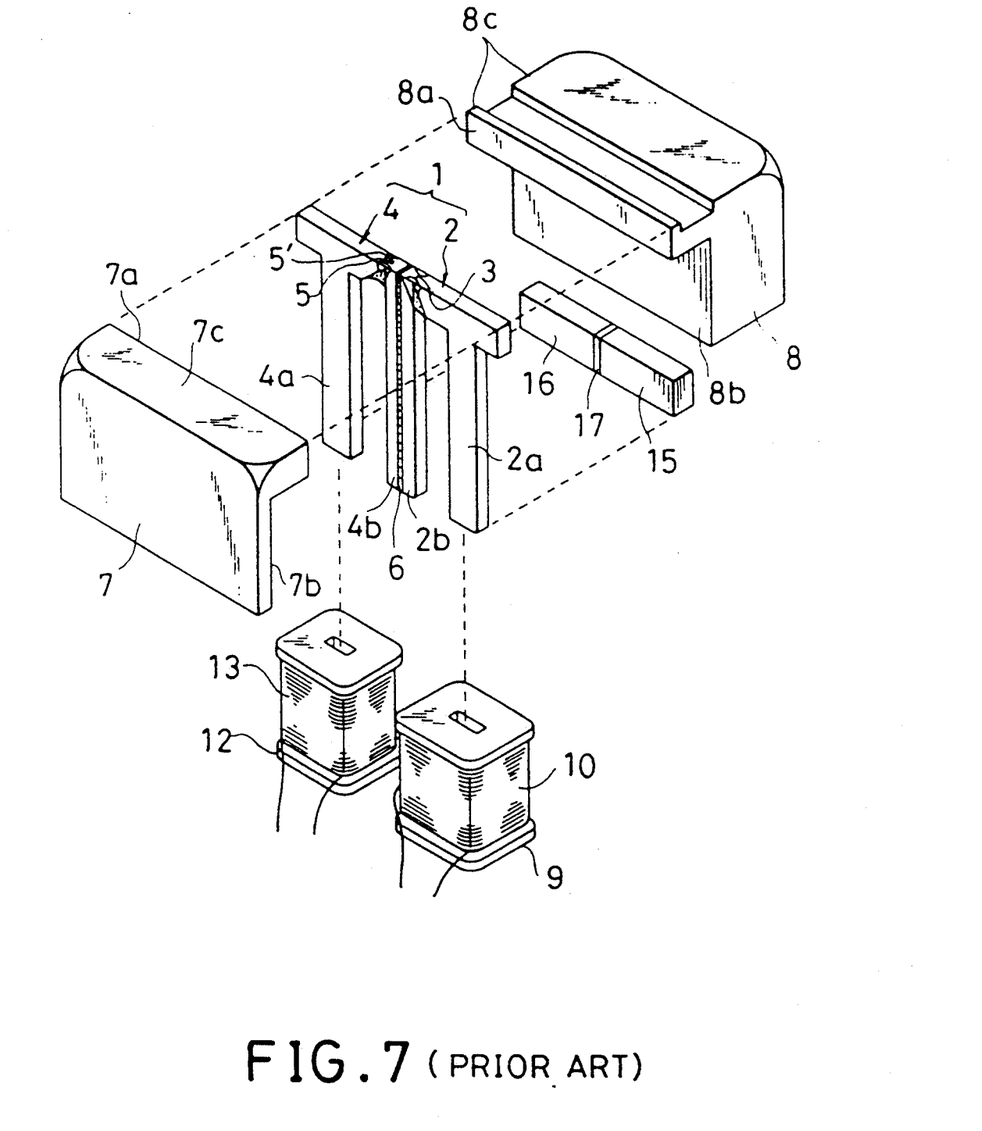
FIG. 7 is an exploded perspective view of the main body of a conventional magnetic head.
Figure 8:
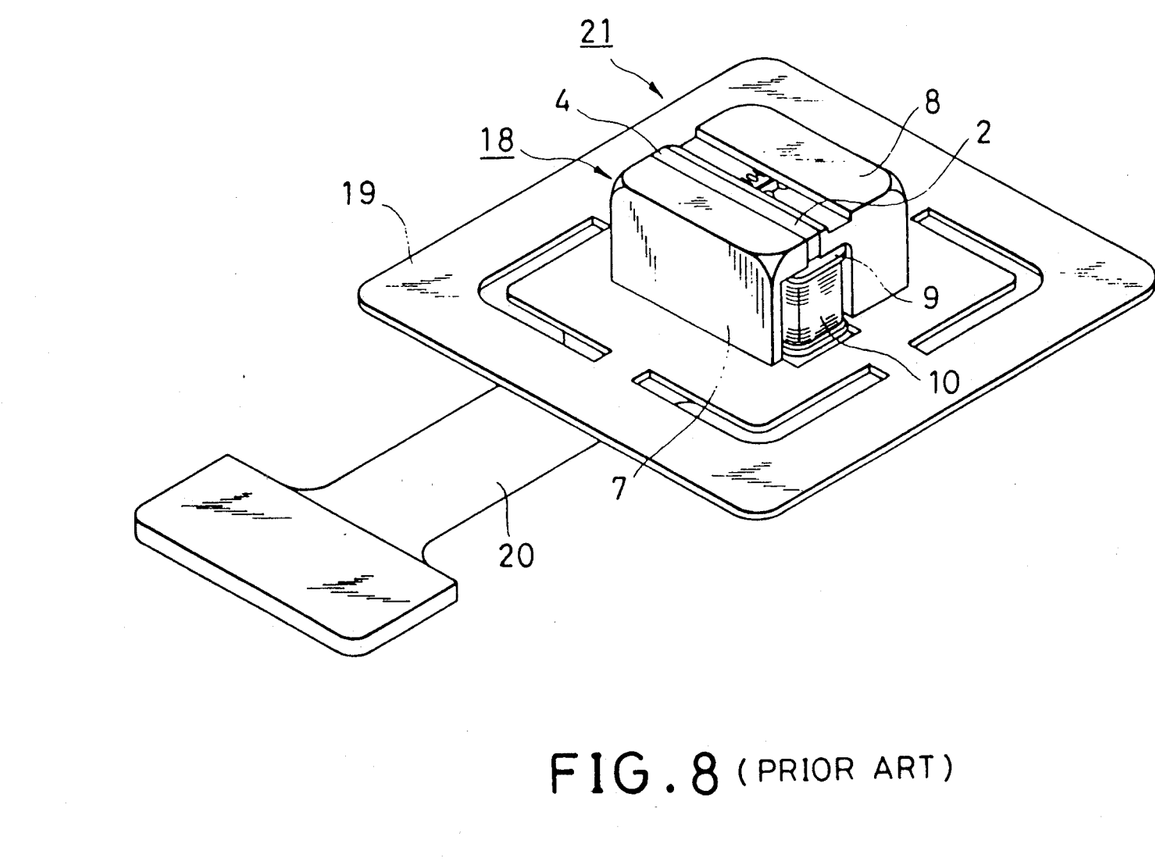
FIG. 8 is a perspective view of the conventional magnetic head.
Figure 9:
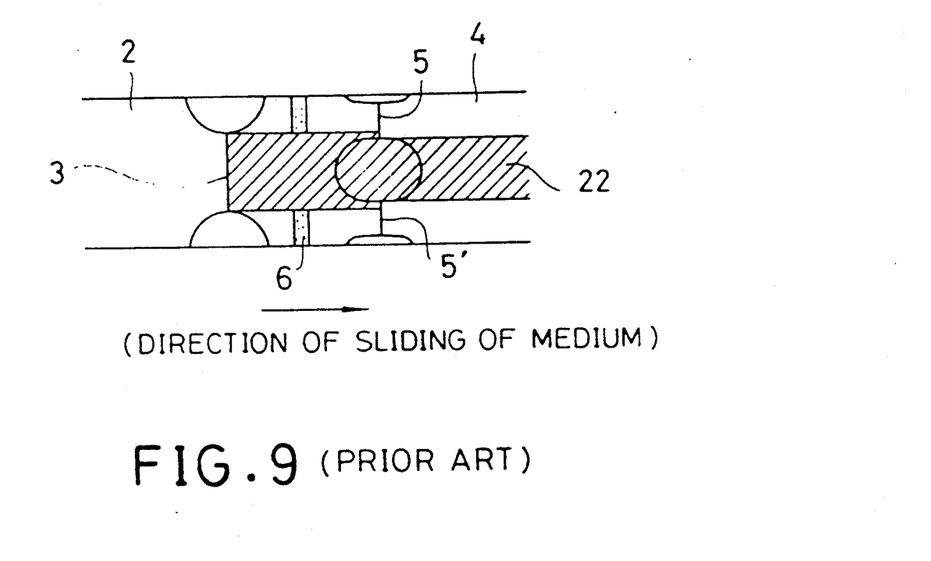
FIG. 9 is an explanatory view illustrating the tunnel erasing technique.

FIG. 7 is an exploded perspective view showing a magnetic head main body, which is a component of the magnetic head shown in FIG. 8. As shown in FIG. 7, reference numeral 1 denotes a front core assembly (to be called the "core assembly" for short) which has a unitary construction consisting of a magnetic read/write core (to be called the "read/write core" for short) 2 and a magnetic erasing core (to be called the "erasing core" for short) 4 for executing the tunnel erasing technique. These cores 2 and 4 are integrally joined together by a spacer 6, which is placed between two I-shaped front core portions 2b and 4b.

The read/write core 2 is fabricated by integrally joining the upper end of the I-shaped front core portion 2b to an upper end of a T-shaped front core portion 2a through a read/write gap 3 and by integrally joining a back core portion 15 to the lower ends of the two front core portions 2a and 2b. The erasing core 4 is fabricated by integrally joining the upper end of the I-shaped front core portion 4b to a T-shaped front core portion 4a through erasing gaps 5 and 5' and by integrally joining a back core portion 16 to the lower ends of the two front core portion 4a and 4b. Before the back core portion 15 and 16 are joined, the read/write core 2 and the erasing core 4 are joined together with the spacer 6 inserted between them, and then nonmagnetic sliders 7 and 8 are joined to the outer surfaces of the two cores 2 and 4 with adhesives or glass bonding and the like. As will be described in detail hereinafter, after coil bobbins 9 and 12 are mounted on the front core portions 2a and 4b, respectively, the back core portions 15 and 16 are joined to the lower ends of the core portions 2a and 4b. The sliders 7 and 8 slide on a magnetic disk (not shown) in order to ensure that the cores 2 and 4 are in stable sliding contact with the magnetic disk and in order to protect them. The sliders are made of ceramic or the like and are L-shaped in cross section. The sliders have cutout portions 7b and 8b, sliding contact surfaces 7c and 8c for making sliding contact with the magnetic disk, and bond areas 7a and 8a for joining with the cores 2 and 4, respectively. The core assembly 1 is sandwiched between the bond areas 7a and 8a of the sliders 7 and 8, which are joined to the core assembly 1 in the direction of its thickness.

The coil bobbin 9 has a read/write coil 10, and the coil bobbin 12 has an erasing coil 13. Both of the bobbins 9 and 12 are fitted on the front core portions 2a and 4a of the core assembly 1, respectively. Thereafter, the back core portions 15 and 16, which are integrally joined together through a spacer 17, are joined to the lower ends of the front core portions 2a, 2b, 4a and 4b.

FIG. 8 illustrates a magnetic head 21 fabricated by securely mounting a magnetic head main body 18 constructed by assembling the above-described components on a supporting plate 19 made of stainless steel or beryllium, copper, and by electrically connecting the ends of the coils 10 and 13 to a flexible printed circuit board 20 connected to the supporting plate 19.

The magnetic head 21 is mounted in a disk drive device (not shown) by securely joining the supporting plate 19 on a head carriage (not shown). The core assembly 1 and the sliding surfaces 7c and 8c of the sliders 7 and 8 slide on the magnetic disk so as to write information thereon by the tunnel erasing technique shown in FIG. 9. More specifically, in the tunnel erasing technique, after data is recorded on the magnetic disk by way of the read/write gap 3 in contact with a magnetic disk moving in the direction indicated by an arrow in FIG. 9, both sides of the recorded data are erased by a pair of the erasing gaps 5 and 5' so that a data track 22 with a predetermined width is defined on the magnetic disk.

Now, the capacity of floppy disk storage has been increased in recent years and the floppy disks which are able to record 10 megabytes or more are now available in the commercial market. The high capacity can be attained by increasing not only the line recording density but also the track density. In the case of a conventional floppy disk with a capacity on the order of 1 or 2M Bytes, the maximum line recording density is 9.7K Bytes and the track density is 135 TPI (Tracks per Inch), but in order to attain a capacity of 10M Bytes or over, both of the line recording density and the track density must be increased about three to four times; that is, the maximum line recording density must be in excess of 35K BPI (Bits Per Inch) and the track density must be in excess of 405 TPI.

In order to increase the track density, instead of a tunnel erasing type magnetic head such as the magnetic head 21 shown in FIGS. 7 and 8, a servo signal type magnetic head can be used when the so-called embedded or buried servo technique is employed. Servo information is written to the magnetic disk when it is manufactured.

Figure 10:
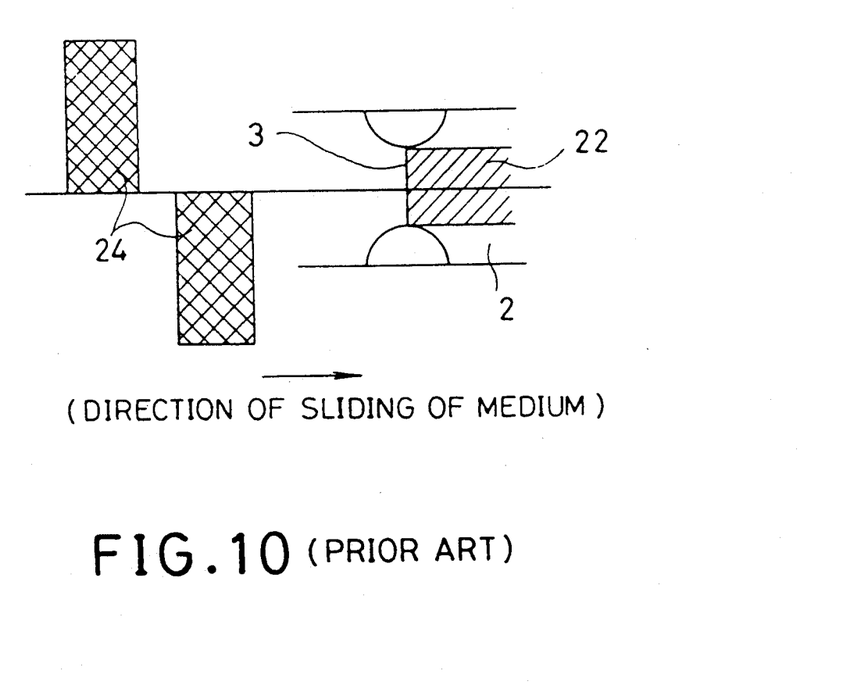
FIG. 10 is an explanatory view illustrating the servo-signal technique.

Referring now to FIG. 10, the method for writing data on the magnetic disk by the servo signal technique will be described. According to this technique, the position of a track is determined in response to servo signals 24 previously recorded on the magnetic disk, and the data is recorded by a magnetic head having only a read/write core 2 which has only a read/write gap 3, whereby the data track 22 is defined. Such a servo-signal type magnetic head can be used to attain a track density in excess of 200 TPI.

In case of a typical floppy disk, interchangeability between the high grade type of disk and the low grade type storage is demanded in order to ensure the interchanging of software and data. For instance, in the case of a 3.5 inch floppy disk with a data-packing density of 2 MB (Mega Bytes), it is now possible to effect a 1 MB R/W (read/write) interchange (that is, it is possible to write and read the 1 MB data) and in the case of a disk with a 4 MB data-packing density, R/W interchangeability between 1 MB and 2 MB is possible. In such disks R/W interchangeability is possible because the track density of the disks is the same 135 TPI. However, if the track density is different, it may be possible to read out the data from a floppy disk with a low track density, but data recording is impossible so that the conventional interchange of software and data is not satisfactory.

Figure 11:
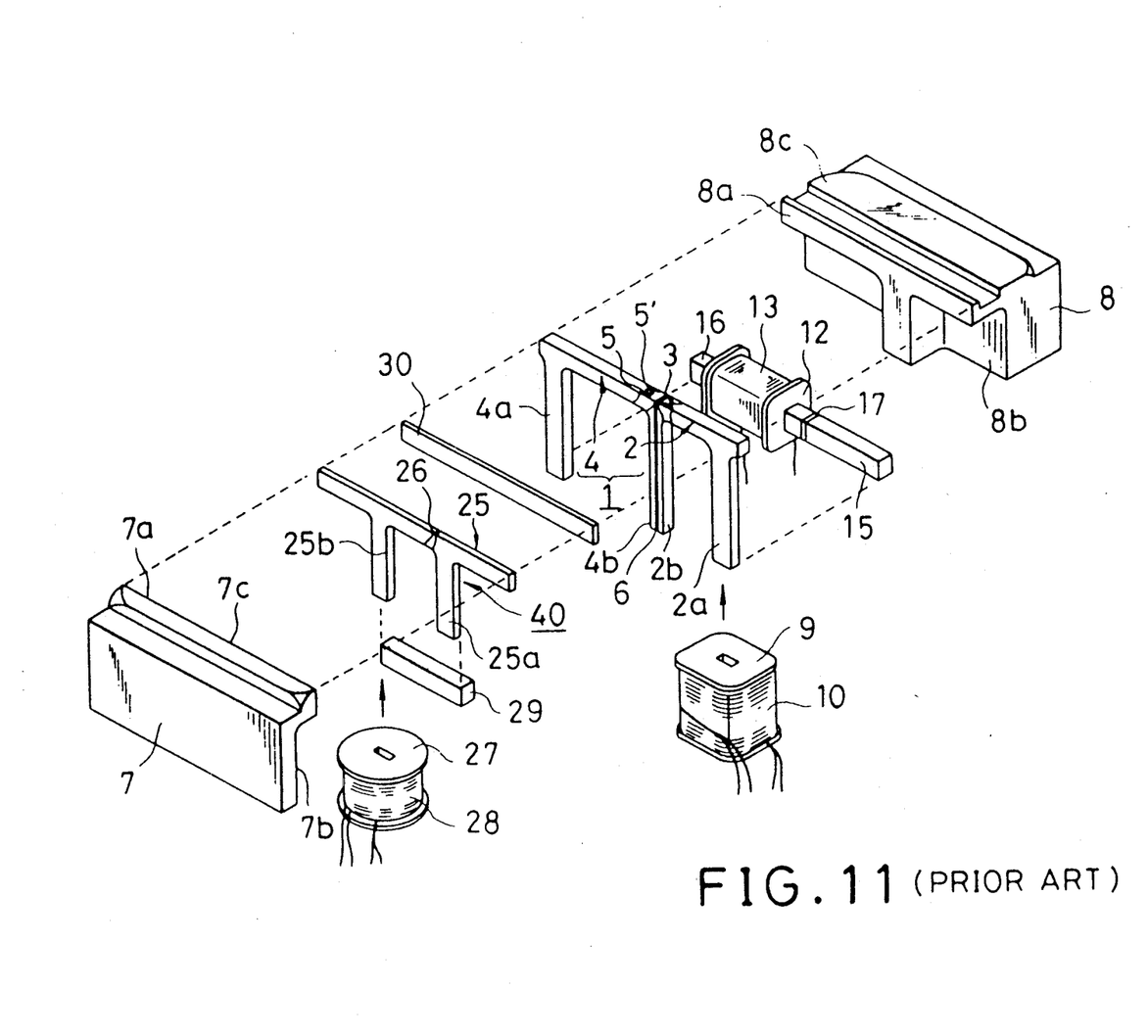
FIG. 11 is an exploded perspective view of the main body of a conventional composite type recording head.

In view of the above, in order to ensure interchangeability even if the track density is different, one might consider a composite type magnetic head in which a tunnel erasing type magnetic core and a servo-signal type magnetic core are arrayed in parallel in the width direction of a track. FIG. 11 illustrates an exploded perspective view showing such a composite type magnetic head. The same reference numerals are used in FIGS. 7, 8, and 11 to indicate similar parts.

Referring now to FIG. 11, the tunnel erasing type read/write core 2 and the erasing core 4 which constitute the core assembly 1 are designed and constructed for a floppy disks with a track density of, i.g., 135 TPI. The core assembly 1 shown in FIG. 11 is different in construction from the core assembly shown in FIGS. 7 and 8, because the coil bobbin 12 of the erasing core 4 is fitted on the back core portion 16 in order to avoid interference with a coil bobbin 27 of a read/write core 40. Therefore, the length of the back core portion 16 is relatively increased and the front core portion 4a is similar in shape to the letter L.

The read/write core 40 is a servo-signal type magnetic core for reading data from and writing data on the magnetic disk. The core 40 is designed and constructed for use with a high track density (for instance, 405 or 540 TPI, or the like). The read/write core 40 comprises a front core assembly 25 (to be called the "core assembly" for short) and a back core portion 29. More specifically, the read/write core 40 is fabricated by joining an L-shaped front core portion 25a and a T-shaped front core portion 25b at their upper regions, leaving a read/write gap 26 between them, and further by securely attaching the back core portion 29 to the lower ends of the core portions 25a and 25b. The bobbin 27 holds a coil 28, and is fitted on the front core portion 25a before the back core portion 29 is joined on the core portions 25a and 25b.

Reference numeral 30 denotes a partition wall plate made of nonmagnetic ferrite or ceramic, and is interposed and securely joined by adhesion between the core assemblies 1 and 25. This partition wall plate 30 is an elongated rectangular plate corresponding in size to the upper ends of the front core portions 2a, 4a, 25a and 25b of the core assemblies 1 and 25. The sliders 7 and 8 are joined to the outer surfaces in the width direction of the tracks, respectively, of the core assemblies 1 and 25.

Figure 12:
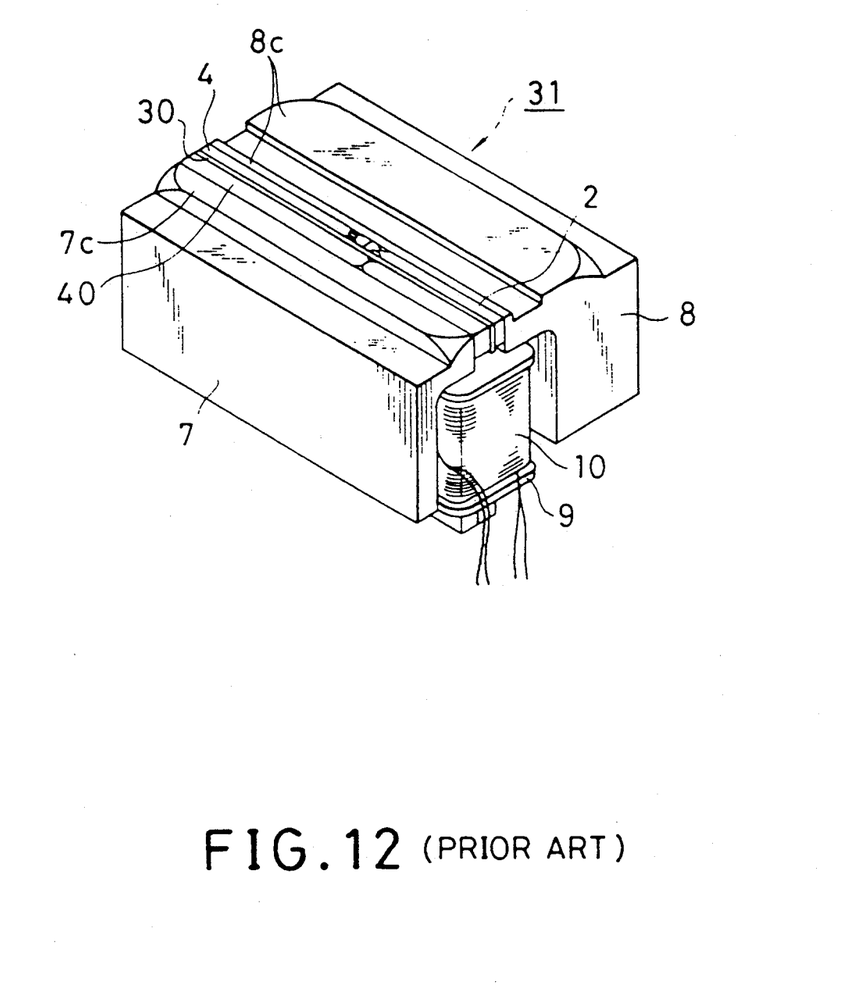
FIG. 12 is a perspective view showing the main body of the conventional composite type recording head.

FIG. 12 illustrates a composite type magnetic head main body 31 fabricated by assembling the above-mentioned components. With this magnetic head main body 31, the core 2, 4 or 40 is suitably selected depending upon the difference in the track density so that read/write interchange between high and low grade apparatuses becomes possible.

However, in the case of the conventional composite head main body 31 described above, both the exposed surfaces of a pair of core assemblies 1 and 25 and the sliding surfaces 7c and 8c of the sliders 7 and 8 keep sliding contact with the recording medium (magnetic disk), and the sliding contact surface area is considerably larger than the sliding contact surface area of an apparatus of the type using only one magnetic core in a core assembly. As a result, when the magnetic head main body 31 is pressed against the surface of the recording medium, the contact pressure is distributed over additional parts beyond the read/write gaps 3 and 26 and the erasing gaps 5 and 5' of the magnetic head main body.

Consequently the contact force between the gaps 3, 26, 5 and 5' and the recording medium decreases, with the result of variation in the spacing between the gaps 3, 26, 5 and 5' and the recording medium, so that the read/write and erasing characteristics of the magnetic head 31 are worsened owing to the spacing increase.

In contrast with this, if the contact pressure mentioned above is increased in order to reduce the spacing, the recording medium is damaged and rubs onto the magnetic head main body 31, so that the reading, writing and erasing operations would be impossible.

SUMMARY OF THE INVENTION

The object of the present invention is to solve the above problems of the prior art and avoid the disadvantages described above.

A more concrete object of this invention to provide a composite type magnetic head which avoids spacing loss and wearing away of the recording medium even if the contact force between the magnetic head and the recording medium is increased so as to improve the sliding contact characteristics of the magnetic head to the recording medium.

In order to achieve this and other objects, a first aspect of the present invention provides a magnetic head having:
  (a) a first magnetic core;
  (b) a second magnetic core;
  (c) a partition wall plate through which the first magnetic core and the second magnetic core are securely jointed in a direction of width of a track; and
  (d) sliders disposed on the outer surfaces of the first and second magnetic cores in the direction of the width of the track;
    at least a part of a surface of the partition wall plate that is opposite to a recording medium being further from the recording medium than surfaces of the first and second magnetic cores and the sliders that are opposite to the recording medium.

A second aspect of the present invention provides a magnetic head having:
  (a) a first magnetic core,
  (b) a second magnetic core;
  (c) a partition wall plate through which the first magnetic core and the second magnetic core are securely joined in a direction of width of a track; and
  (d) sliders disposed on the outer surfaces of the first and second magnetic cores in the direction of width of the track;
    at least a part of the partition wall plate being made of a material which wears out more easily than that of the magnetic cores and the sliders.

A third aspect of the present invention provides a magnetic head having:
  (a) a first magnetic core;
  (b) a second magnetic core;
  (c) a partition wall plate which comprises a magnetic plate and a pair of non-magnetic plates connected on both sides of the magnetic plate, and through which the first magnetic core and the second magnetic core are securely jointed in a direction of width of a track; and
  (d) sliders disposed on the outer surfaces of the first and second magnetic cores in the direction of the width of the track;
    at least a part of a surface of the non-magnetic plates that is opposite to a recording medium being further from the recording medium than surfaces of the first and second magnetic cores and the sliders that are opposite to the recording medium.

In a first embodiment of the magnetic head in accordance with the present invention, at least part of the surface of the partition wall plate facing the recording medium is separated from the recording medium more than the contact surfaces of the first and second magnetic cores and the sliders against the recording medium, so that a concave groove exists. Consequently, the contract surface area of the magnetic head to the recording medium is decreased by the concave groove, so that the force applied to the recording medium per unit area is increased. Accordingly, the pressure of contact between the recording head and the recording medium is increased and also the spacing between them is decreased so as to eliminate spacing loss. Therefore, the reading, writing and erasing characteristics of the magnetic head do not worsen. In general, if the force applied to the recording medium per unit area by a prior art magnetic head is increased, the recording medium may be worn away and damaged by the magnetic head, so that reading, writing and erasing operations may be impossible. However, according to the first embodiment with the present invention, the concave groove of the magnetic head produces a constant air pressure during the rotation of the recording medium. Accordingly, the wearing away mentioned above and the problems caused by it do not occur.

In a second embodiment of the recording head in accordance with the present invention, the partition wall plate is made of material which wears out more easily than the magnetic cores and the sliders, so that the partition wall plate is worn so as to form a concave groove during the sliding contact with the recording medium. The concave groove thus constructed acts the same as the concave groove of the first embodiment. This is, the concave groove prevents degradation of the reading, writing and erasing characteristics, damages caused by wearing away of the recording medium, and the interruption of the reading, writing, and erasing operations of the magnetic head.

In a third embodiment of the recording head in accordance with the present invention, electrical interference is prevented by the magnetic plate, which is a component of the partition wall plate. In addition, at least the non-magnetic portion of the partition wall plate has a concave groove, so that the partition wall plate provides the same effects as the second embodiment.

The above and other objects, effects, features and advantages of the present invention will become more apparent from the following description of embodiments thereof taken in conjunction with the accompanying drawings.

BRIEF DESCRIPTION OF THE DRAWINGS

Embodiments of the invention will now be described, by way of example, and with reference to the accompanying drawings in which.

DETAILED DESCRIPTION OF THE PREFERRED EMBODIMENTS

Throughout the following detailed description similar reference numerals refer to similar elements in all of the drawings.

Figure 1:
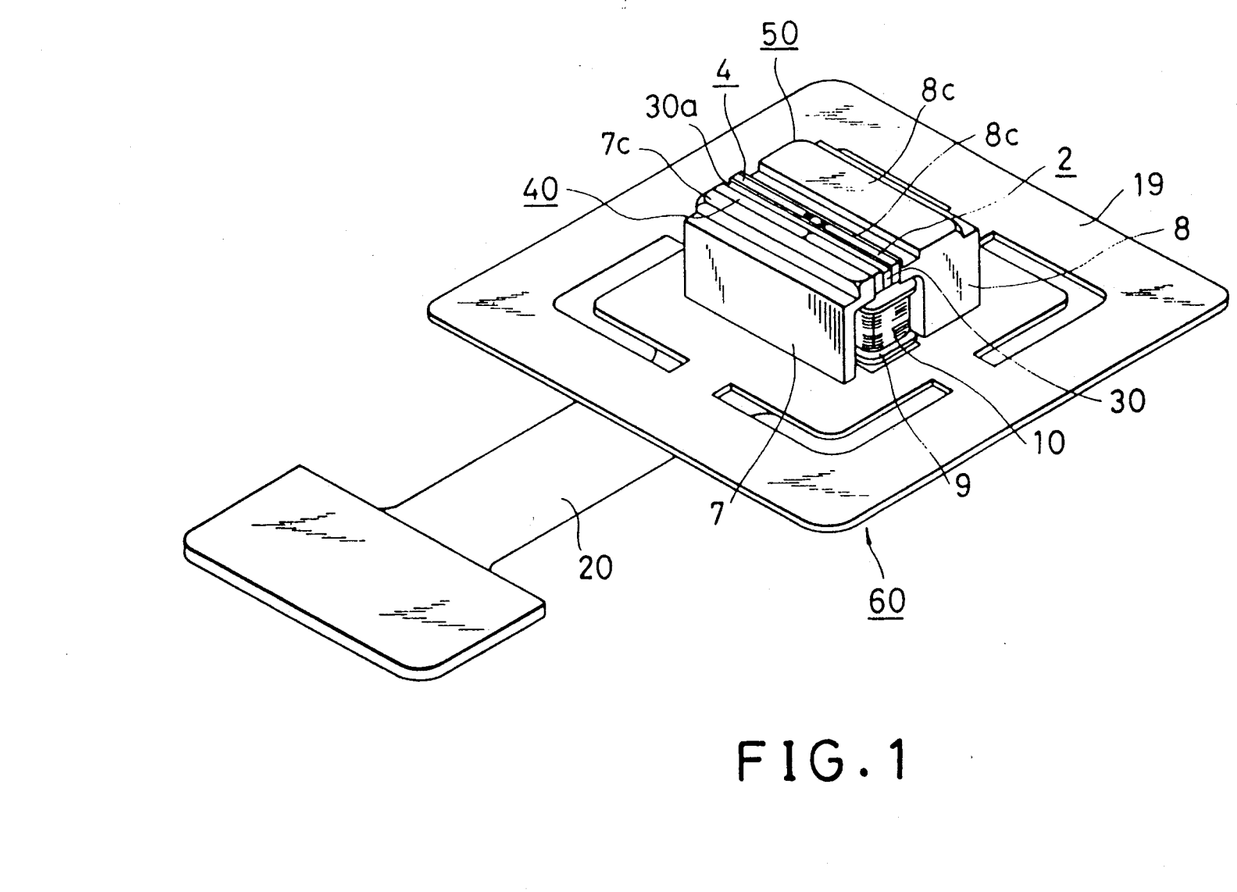
FIG. 1 is a perspective view illustrating the construction of a first embodiment of a composite type magnetic head in accordance with the present invention.
Figure 2:
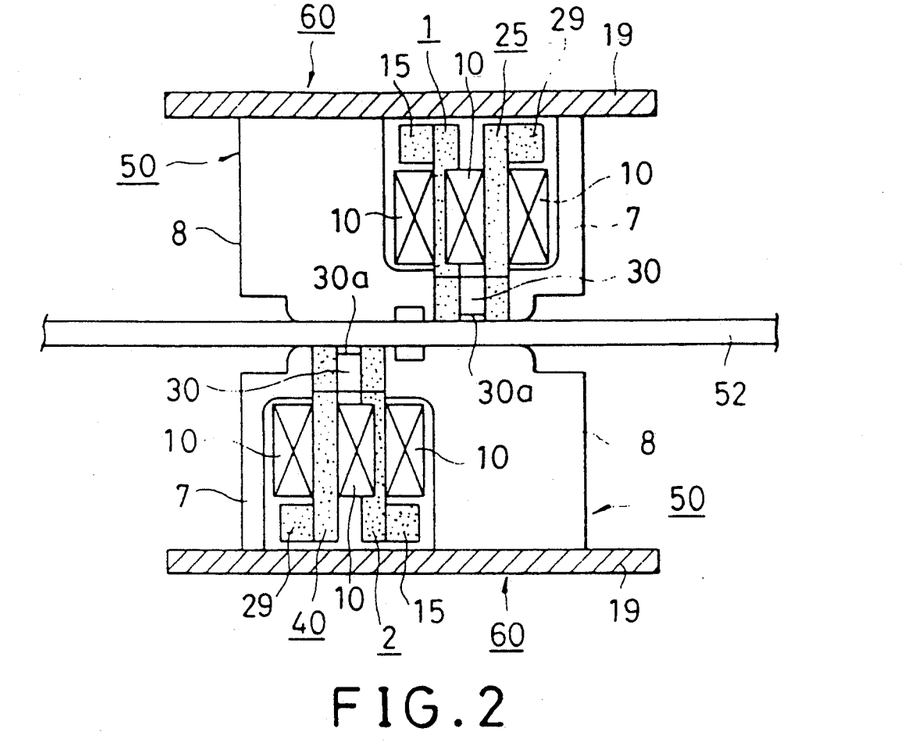
FIG. 2 is a sectional view illustrating the magnetic head shown in FIG. 1 being used.
Figure 3:
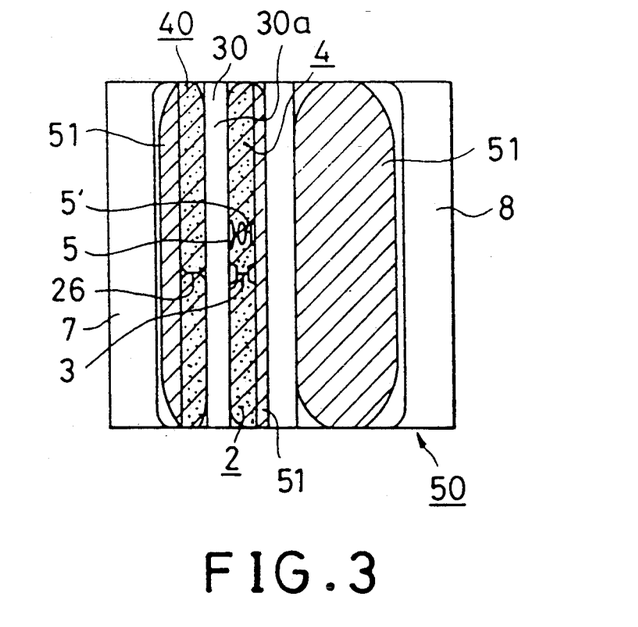
FIG. 3 is a plan view showing the main body of the magnetic head shown in FIG. 1.

(i) First Embodiment, FIG. 1 through FIG. 3

Referring to FIG. 1, reference numeral 60 denotes a composite type magnetic head in accordance with a first embodiment of the present invention. The magnetic head 60 is assembled by securely mounting a magnetic head main body 50 on a supporting plate 19 made of stainless steel or beryllium copper or the like, and by electrically connecting the ends of a coil 10 to a flexible printed circuit board 20 connected to the supporting plate 19.

The components of the main body 50 itself are similar to the components of the main body 31 of the conventional magnetic head shown in FIGS. 11 and 12, so that the same reference numerals are used to indicate similar members and an explanation of these members is omitted.

The first embodiment is different from the conventional composite recording head shown in FIG. 11 and FIG. 12 with regard to the partition wall plate 30 in the main body 50. More specifically, as best shown in FIGS. 2 and 3, the first embodiment is different from the conventional recording head in that the surface 30a of the partition wall plate 30 that faces a recording medium 52 is disposed at a withdrawn position relative to sliding contact surfaces 51 (the hatching portions shown in FIG. 3) of magnetic cores 2, 4 and 40 and sliders 7 and 8 against the recording medium 52.

Next, the operation of the first embodiment thus constructed will be described.

The partition wall plate 30 of the main body 50 provides a concave groove, so that the plate 30 does not contact the recording medium 52. As a result, the contact surface between the magnetic head main body 50 and the recording medium 52 is decreased by the concave groove as compared with the conventional recording heads. Accordingly, the force applied to the recording medium 52 by the main body 50 per unit area is increased due to the reduction of the contact surface. As a result, the contact force between the main body 50 and the recording medium 52 is increased, so that the spacing between them is minimized, and consequently no spacing loss results. According to the first embodiment, therefore, the reading, writing and erasing characteristics of the magnetic head 60 do not worsen.

Moreover, the concave groove due to the partition wall plate 30 produces air pressure of a constant value during the rotation of the recording medium 52. Accordingly, even if the contact force between the main body 50 and the recording medium 52 is increased, there is no danger that the recording medium 52 might be damaged by the main body 50.

Figure 4:
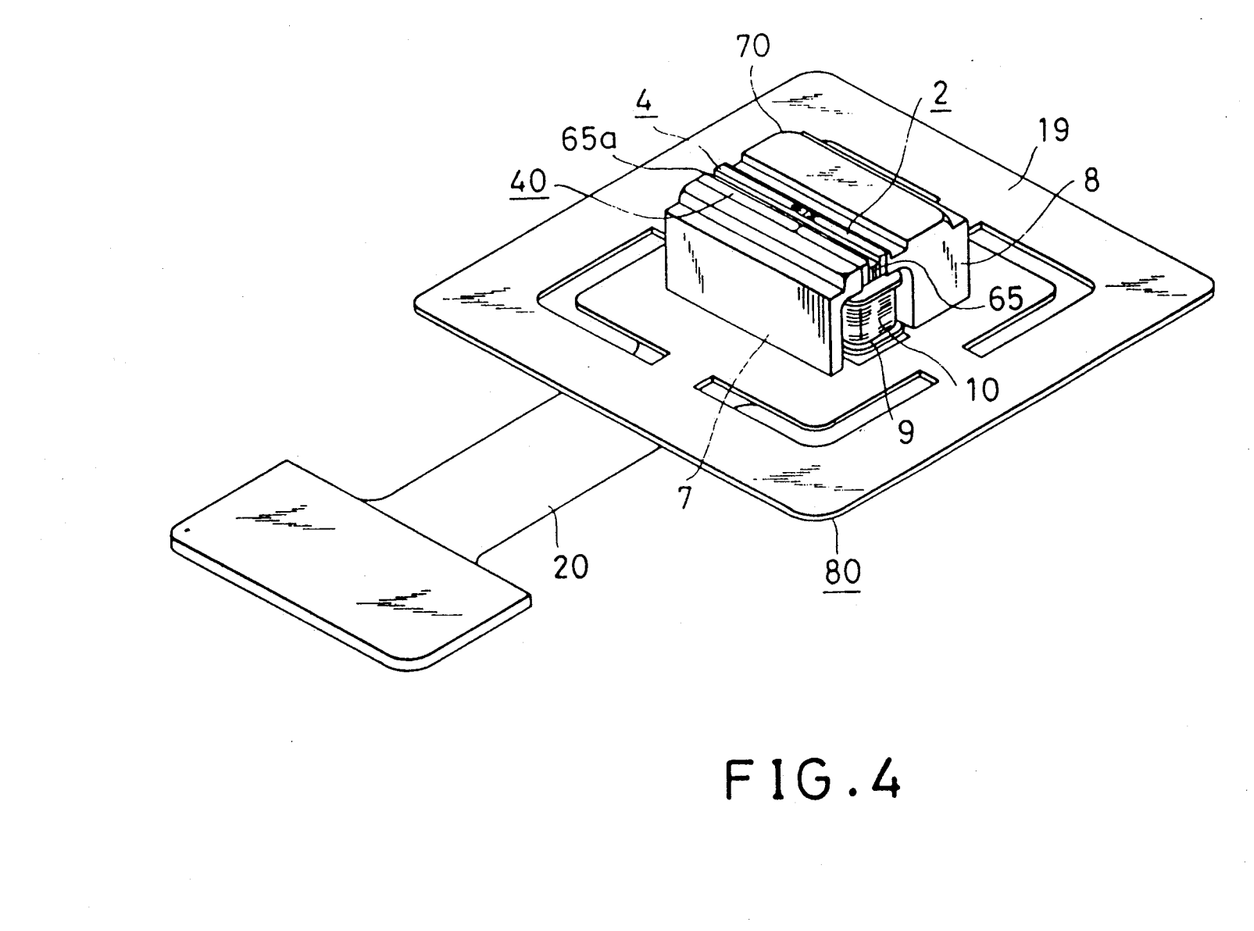
FIG. 4 is a perspective view illustrating the construction of a second embodiment of a composite type magnetic head in accordance with the present invention.
Figure 5:
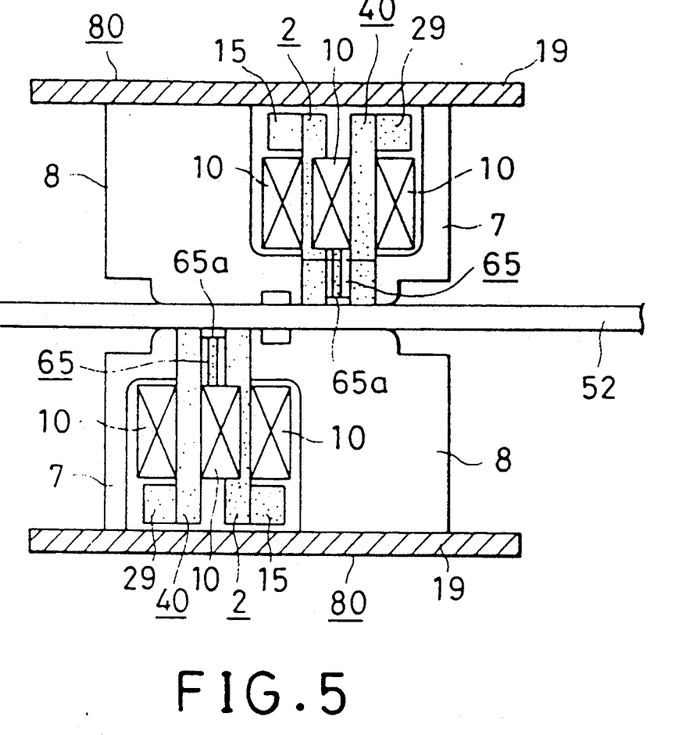
FIG. 5 is a sectional view illustrating the magnetic head shown in FIG. 4 being used.
Figure 6:
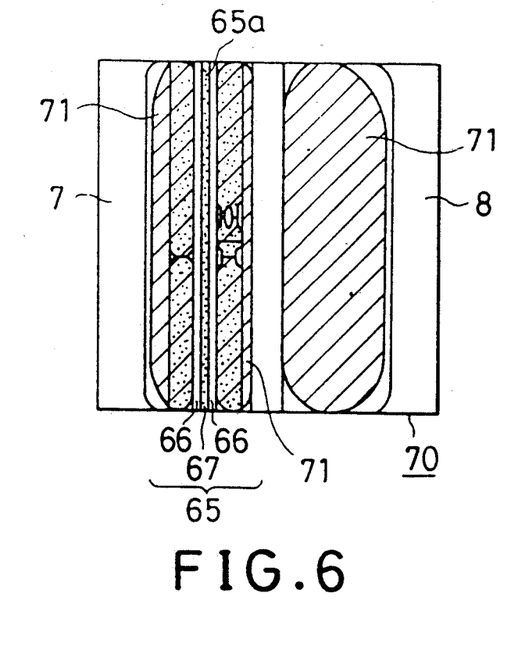
FIG. 6 is a plan view showing the main body of the magnetic head shown in FIG. 4.

(ii) Second Embodiment, FIG. 4 through FIG. 6

Referring next to FIGS. 4-6, a second embodiment of a composite type magnetic head in accordance with the present invention will be described in detail.

In FIG. 4, reference numeral 80 denotes a magnetic head in accordance with the second embodiment of the present invention. The recording head 80 is assembled by securely mounting a magnetic head main body 70 on a supporting plate 19 made of stainless steel or beryllium copper or the like, and be electrically connecting the ends of the coil 10 to a flexible printed circuit board 20 connected the supporting plate 19.

The components of the main body 70 are substantially similar to the components of the main body 50 of the aforesaid first embodiment except for a partition wall plate 65. The same reference numerals are used to indicate similar members and such explanation of the members is omitted. The second embodiment is different from the first embodiment in that the partition wall plate 65 comprises a magnetic plate 67 made of a magnetic material such as ferrite or the like and non-magnetic plates 66 which are made of a non-magnetic material such as glass, ceramic or the like and which are securely joined or bonded to both side surfaces of the magnetic plate 67.

The arrangement of the second embodiment is similar to the first embodiment in that the surface 65a of the partition wall plate 65 that faces the recording medium 52 is disposed at a withdrawn position relative to the contact surfaces 71 (the hatched areas shown in FIG. 6) of the magnetic cores 2, 4 and 40 and the sliders 7 and 8 against the recording medium 52.

In the second embodiment, the magnetic plate 67 of the partition wall plate 65 serves very effectively to prevent interference, and the other effects of this case are substantially similar to the first embodiment.

(iii) Third Embodiment

Referring back to FIGS. 1-3, the third embodiment of the present invention will be now described in detail. A magnetic head according to the third embodiment, instead of the partition plate 30 of the first embodiment, has a partition wall plate which is made of a material which wears out more easily than the materials of the magnetic cores 2, 4 and 40 and the sliders 7 and 8, and the surface of the partition wall plate that faces the recording medium is flush with the contact surfaces 51.

The partition wall plate wears during the sliding contact with the recording medium 52, and the worn portion provides a concave groove which produces the same benefits as the first embodiment.

(iv) Fourth Embodiment

Referring back to FIGS. 4-6, the fourth embodiment of the present invention will be now described in detail. In the fourth embodiment, the surface of the magnetic plate 67 of the partition wall plate 65 which paces the recording medium 52 is flush with the sliding contact surface 71.

The fourth embodiment thus constructed can attain the same effects as the second embodiment, and is more effective for preventing interference relative to the second embodiment.

As described above, according to the first, second, third and fourth embodiments of the present invention, one need not worry about spacing loss and wearing away of the recording medium, because the contact force between the magnetic head and the recording medium can be adjusted so that the tracking performance and adhesion can be improved.

Furthermore, in the third and fourth embodiments, interference can be prevented or eliminated.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A magnetic head for use with a recording medium which moves in a sliding direction relative to said magnetic head, said sliding direction being transverse to a direction of width of a track on said recording medium, said magnetic head comprising:
   (a) a first magnetic core having a read/write core and an erasing core arranged downstream from said read/write core in said sliding direction of said recording medium, said first magnetic core having a surface that is disposed opposite said recording medium and having a reverse surface that faces away from said recording medium;
   (b) a second magnetic core having only a read/write core, said second magnetic core having a surface that is disposed opposite said recording medium and having a reverse surface that faces away from said recording medium;
   (c) a partition wall plate through which said first magnetic core and said second magnetic core are securely joined in said direction of width of a track, said partition wall plate having a surface that is disposed opposite said recording medium and having a reverse surface that faces away from said recording medium; and
   (d) sliders disposed on outer surfaces of both of said first and second magnetic cores in said direction of width of a track, said sliders having surfaces that are disposed opposite said recording medium,
      at least part of said surface of said partition wall plate that is disposed opposite said recording medium being separated from said recording medium more than said surfaces of said first and second magnetic cores and said sliders that are disposed opposite said recording medium, and
      said reverse surface of said partition wall plate being arranged on a common plane with at least a portion of said reverse surface of said first magnetic core and at least a portion of said reverse surface of said second magnetic core.

2. A magnetic head as claimed in claim 1, wherein said partition wall plate includes a magnetic plate and a pair of non-magnetic plates securely joined on both sides of said magnetic plate.

3. A magnetic head as claimed in claim 2, wherein said non-magnetic plates have surfaces that are disposed opposite said recording medium, and wherein said surfaces of said non-magnetic plates that are disposed opposite said recording medium are separated from said recording medium more than said surfaces of said first and second magnetic cores and said sliders that are disposed opposite said recording medium.

4. A magnetic head as claimed in claim 3, wherein said magnetic plate has a surface that is disposed opposite said recording medium, and wherein said surface of said magnetic plate that is disposed opposite said recording medium is flush with said surfaces of said first and second magnetic cores and said sliders that are disposed opposite said recording medium.

5. A magnetic head as claimed in claim 3, wherein said surface of said magnetic plate that is disposed opposite said recording medium is also separated from said recording medium more than said surfaces of said first and second magnetic cores and said sliders that are disposed opposite said recording medium.

6. A magnetic head as claimed in claim 1, wherein said partition wall plate does not touch said recording medium or either slider, wherein said first core has an elongated portion which is disposed parallel to said recording medium and legs which are disposed perpendicular to said recording medium, said reverse surface of said first magnetic core being a surface of said elongated portion, and further comprising a coil wound around one of said legs, said common plane on which said reverse surface of said partition wall plate is arranged being disposed between said coil and said recording medium.

7. A magnetic head as claimed in claim 6, wherein said partition wall plate is a unitary element that is made of a material which wears out more easily than the material of said sliders and cores.

8. A magnetic head as claimed in claim 6, wherein said partition wall plate comprises an elongated magnetic plate sandwiched between two elongated non-magnetic plates.

9. A magnetic head for use with a recording medium which moves in a sliding direction relative to said magnetic head, said sliding direction being transverse to a width direction of a track on said recording medium, said magnetic head comprising:
 (a) a first magnetic core;
 (b) a second magnetic core;
 (c) a partition wall plate through which said first magnetic core and said second magnetic core are securely joined in said direction of width of a track; and
 (d) sliders disposed on outer surfaces of both said first and second magnetic cores in said direction of width of said track,
  at least a part of said partition wall plate being made only of a material which wears out more easily than that of said magnetic cores and said sliders.

10. A magnetic head as claimed in claim 9, wherein said first magnetic core comprises a read/write core and an erasing core arranged downstream from said read/write core in said sliding direction of said recording medium, and said second magnetic core comprises only a read/write core.

11. A magnetic head as claimed in claim 9, wherein said partition wall plate includes a magnetic plate and a pair of non-magnetic plates securely joined on both sides of said magnetic plate.

12. A magnetic head for use with a recording medium, comprising:
 (a) a first magnetic core having a surface that disposed opposite said recording medium;
 (b) a second magnetic core having a surface that is disposed opposite said recording medium;
 (c) a partition wall plate which includes a magnetic plate and a pair of non-magnetic plates connected on both sides of said magnetic plate, said magnetic plate and non-magnetic plates having surfaces that are disposed opposite said recording medium, said first magnetic core and said second magnetic core being securely joined through said partition wall plate in a direction of width of a track of said recording medium; and
 (d) sliders disposed on outer surfaces of both of said first and second magnetic cores in said direction of the width of said track,
  at least a part of said surfaces of said non-magnetic plates that are disposed opposite said recording medium being separated from said recording medium more than said surfaces of said first and second magnetic cores and said sliders that are disposed opposite said recording medium.

13. A magnetic head as claimed in claim 12, wherein said surfaces of said non-magnetic plates that are disposed opposite said recording medium are exposed to said recording medium and separated from it only by air.

* * * * *